Feb. 23, 1971   R. G. STATZ   3,565,490
WHEEL ASSEMBLY
Filed Aug. 18, 1969   2 Sheets-Sheet 1
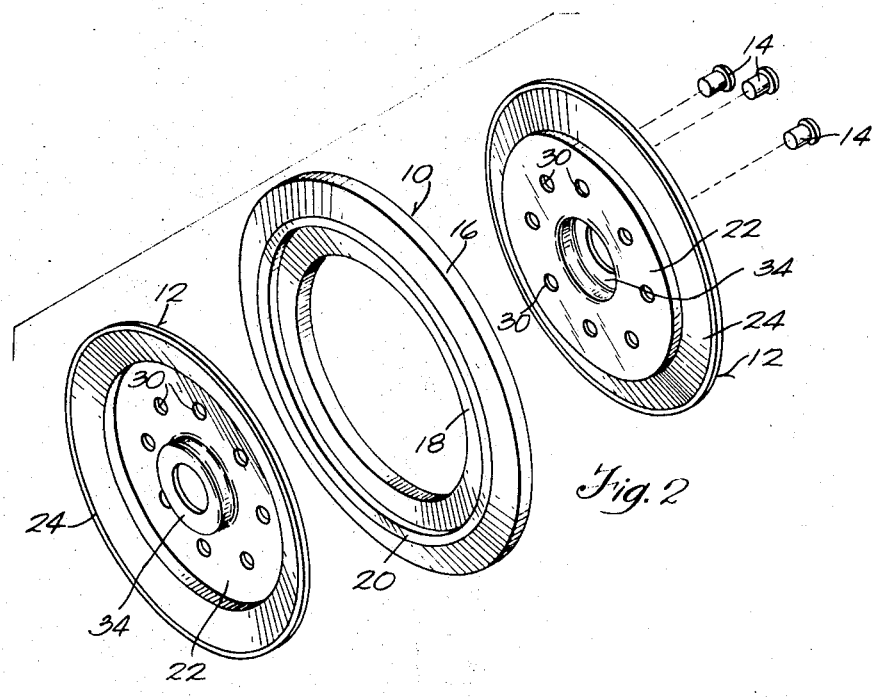
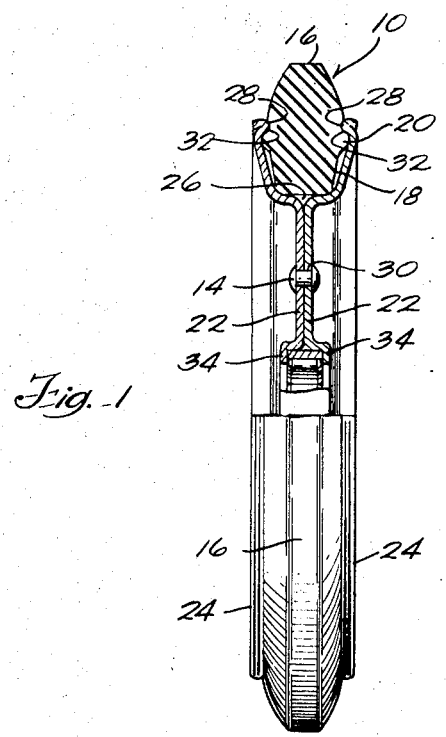
Inventor
Robert G. Statz
By Paul R. Puerner
Attorney Feb. 23, 1971 R. G. STATZ 3,565,490
WHEEL ASSEMBLY
Filed Aug. 18, 1969 2 Sheets-Sheet 2
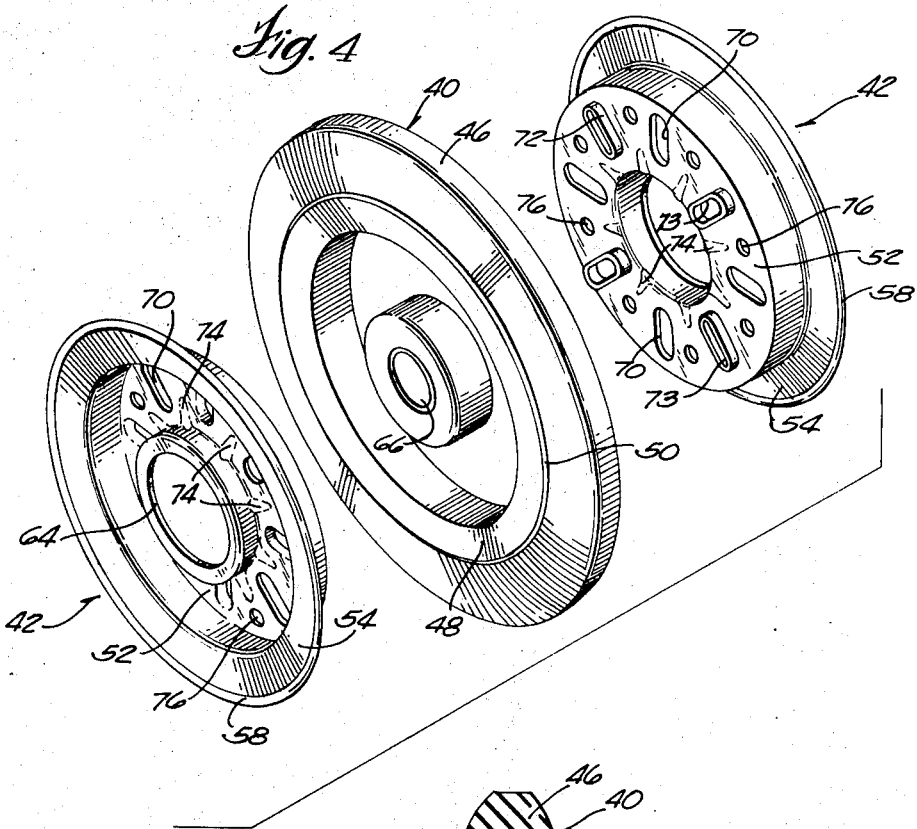
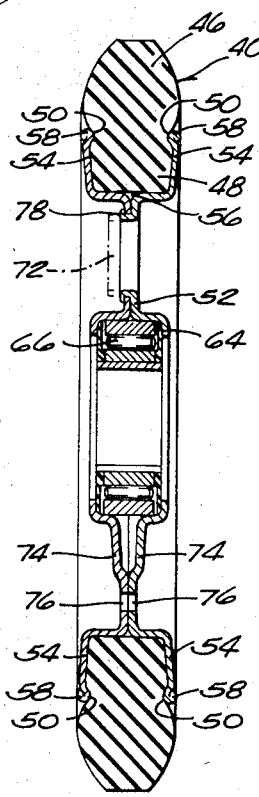
Inventor
Robert G. Statz
By Paul R. Puerner
Attorney United States Patent Office 3,565,490
Patented Feb. 23, 1971

3,565,490
WHEEL ASSEMBLY
Robert G. Statz, 2478 N. 66th St.,
Milwaukee, Wis. 53210
Continuation-in-part of application Ser. No. 720,165,
Apr. 10, 1968. This application Aug. 18, 1969, Ser.
No. 850,990
Int. Cl. B60b 3/12
U.S. Cl. 301—63                                    4 Claims

ABSTRACT OF THE DISCLOSURE

A tire member having a tread portion and a mounting rim portion, the latter portion disposed between a pair of mating wheel plate members having a central hub portion and a retaining flange portion which curves outwardly from the hub portion to form a space in which the mounting rim portion of the tire is retained. The outer edges of each flange portion are formed with a reverse curve to provide a smoothly rounded retaining nose which extends inwardly around the entire circumference of each flange. The parts are assembled by positioning the tire between the flange portions of the wheel plates and then compressing the plates together until the hub portions move into face-to-face contact with each other. The plates are then fastened together by a riveting means with the retaining nose portions on the rims compressing the material of the tire thus securely locking the tire between the wheel plates.

CROSS-REFERENCE TO RELATED APPLICATION

This is a continuation-in-part of a copending application filed Apr. 10, 1968, Ser. No. 720,165, and now abandoned.

BACKGROUND OF THE INVENTION

(I) Field of invention

This invention relates to an improved wheel assembly. While the wheel assembly of this invention may be used in a number of ways, one typical use is as a so-called "bogie" wheel on a snowmobile.

(II) Description of prior art

The convention wheel assembly of the type involved herein prior to this invention employed a retaining rim and tire arrangement wherein the tire was retained on the wheel members by the frictional engagement of a pair of relatively flat retaining flanges with the sides of the tire.

The principal object of this invention is to provide an improved wheel assembly wherein the tire member is not only securely locked in assembled position but, in addition, will accomplish this objective without any tendency of the tire to be cut or weakened by the rim in either assembly or use. A further important object is to provide a wheel assembly which can be made from a few relatively inexpensive parts and involves a few easily performed steps to assemble. Other objects will be pointed out in or be apparent from the written description and claims as will obvious modifications of the two embodiments shown in the drawings.

SUMMARY OF THE INVENTION

The wheel assembly of this invention is comprised of a tire member having a tread portion and a mounting rim portion together with a pair of wheel plate members each having a central hub portion and a retaining flange portion. The flange portions are each provided with a smoothly rounded nose portion adapted to engage and compress the sides of the tire. The assembly is completed by fastening means such as integral rivets which serve to securely hold the wheel plate members together with the retaining flanges thereof in locking engagement with the opposite sides of the tire member. In the preferred embodiment, the tire member is provided with a pair of oppositely facing retaining grooves formed on the sides thereof which cooperate with the nose portions on the wheel plate flanges to securely lock the tire between the wheel plate members.

DESCRIPTION OF DRAWINGS

FIG. 1 is a side elevation view of one embodiment of the wheel and tire assembly of this invention with a portion thereof broken away;

FIG. 2 is an exploded perspective view of the assembly shown in FIG. 1;

FIG. 3 is a cross sectional end view of an alternative embodiment of the wheel and tire assembly of this invention; and FIG. 4 is an exploded perspective view of the assembly shown in FIG. 3.

DESCRIPTION OF PREFERRED EMBODIMENTS

Referring to the drawings in detail, FIGS. 1 and 2 illustrate one embodiment of this invention. The present invention can best be described by a step-by-step description of the steps employed in the fabrication of the assembly. The principal parts of one embodiment are shown in FIG. 2 and include a tire member 10, a pair of mating wheel plate members 12, 12 and a plurality of rivets 14.

Tire 10 may be made of any suitable resilient material such as rubber and is comprised of a tread portion 16 and a mounting rim portion 18. A pair of circular retaining ridges 20, 20 are formed on opposite sides of the tire at the junction between portions 16 and 18.

Wheel plate members are preferably steel stampings and are of identical construction with each stamping comprised of a central hub portion 22 and a retaining flange or rim portion 24. As clearly shown in FIG. 1, flange portion 24 curves outwardly from the hub portion to form a space 26 in which tire 10 is retained. The outer edges of each flange portion 24 are formed with a reverse curve to form a smoothly rounded retaining nose 28 which extends inwardly around the entire circumference of the flange.

The parts described above are assembled by positioning tire 10 between the flange portions 24, 24 of wheel plates 12, 12 and then pressing the plates together until hub portions 22, 22 move into face-to-face contact with each other. With the parts thus positioned, the assembly is completed by the installation of rivets 14 in the aligned openings 30 provided in hub portions 22. The flange portions 24, 24 and tire 10 are dimensioned so that when the wheel plates 12, 12 are assembled as described above, retaining nose portions 28, 28 on the rims compress the material of the tire about $\frac{1}{16}$ inch in the areas thereof immediately adjacent ridges 20, 20 formed thereon. Such compression of the sidewall of the tire forms grooves 32, 32 in the tire as shown in FIG. 1.

The central portion of each wheel plate is formed to provide bearing housing portions 34, 34 which together form a housing in which a suitable bearing assembly 36 may be housed when the plates are in assembled position as shown in FIG. 1. This arrangement provides a steel armor shield over the bearing assemblies.

From the foregoing, it will be appreciated that with the parts assembled as shown in FIG. 1, the interaction of retaining nose portions 28, 28 with ridges 20, 20 very effectively serves to lock the tire securely between the wheel plates in the completed assembly. The smoothly rounded contour of nose portions 28, 28 prevents any tendency of the tire to be cut or weakened by the rim in assembly or use.

It should also be noted that the space 26 provided between flanges 24, 24 of wheel plates 12, 12 is dimensioned to provide an expansion space for tire 10 to thus allow heavy shock loads to be absorbed by the assembly without putting undue stress on the wheel flanges.

FIGS. 3 and 4 illustrate a second embodiment of this invention which includes a tire member 40, and a pair of mating wheel plate members 42, 42.

Tire 40 is similar in characteristic to tire 10 in that it may be made of any suitable resilient material such as rubber and is comprised of a tread portion 46 and a mounting rim portion 48. A pair of circular retaining grooves 50, 50 are formed on opposite sides of the tire at the junction between portions 46 and 48. Rim portion 48 has a different cross section compared to portion 18 in FIG. 1, the significance of which will be discussed hereinafter.

Wheel plate members 42, 42 are preferably steel stampings and are of identical construction with each stamping comprised of a central hub portion 52 and a retaining flange 54. As clearly shown in FIG. 3, flange portion 54 curves outwardly from hub portion 52 to form a space 56 in which rim portion 48 of tire 40 is retained. The outer edges of each flange portion 54 are formed with a reverse curve to form a smoothly rounded retaining nose 58 which extends inwardly around the entire circumference of the flange.

The central portion of each wheel plate is formed to provide bearing housing portions 64, 64 which together form a housing in which a suitable bearing assembly 66 may be housed when the plates are assembled as shown in FIG. 3. This arrangement provides a steel armor shield over the bearing assemblies.

A significant distinction between the embodiment shown in FIGS. 3 and 4 and the earlier described embodiment shown in FIGS. 1 and 2 is the means employed for securely fastening plate members 42, 42 to each other. Hub portion 52 of each plate member 42, as clearly shown in FIG. 4, is provided with a plurality of oblong shaped openings 70 and oblong shaped flanges 72 alternately spaced around the central bearing housing portion 64. Openings 70 and flanges 72 are produced as a part of the stamping operation employed to produce the plate members and thus flanges 72 are integrally formed with the plate member with the material inside the flanges 72 removed to produce additional openings 73. In the embodiment shown in FIG. 4, four (4) openings 70 and four (4) flanges 72 are provided with the major axis of both the openings and flanges extending radially from the center of the plate member with flanges 72 on one plate shaped to fit snugly within the openings 70 in the other plate.

The parts described above are assembled by positioning tire 40 between flange portions 54, 54 of wheel plates 42, 42 with the flanges 72 on one plate positioned opposite the openings 70 on the other plate. In this position, the wheel plates are pressed together until hub portions 52, 52 are in face-to-face contact with each other and with flanges 72 extending through the mating openings 70 as shown in dotted lines in FIG. 3. With the parts thus positioned, the assembly is completed by riveting over or deforming flanges 72 over the edges of openings 70 as indicated by reference numeral 78 in FIG. 3 to thereby securely rivet the plates together in assembled position. Although the assembly shown in FIG. 4 has four equally spaced openings and flanges, it will be appreciated that other arrangements may be used. It is preferred, however, that an even number be used so that wheel plates 42, 42 are identical and therefore cheaper to produce from a manufacturing standpoinnt.

In addition to the foregoing, hub portion 52 is provided with a plurality of radially extending reinforcing ribs 74 which extend at least partially over the bearing housing portion 54. The ribs are spaced between each elongated hole 70 and significantly increase the strength of the assembly. It has also been found that by providing a plurality of circular apertures 76 angularly spaced between elongated holes 70 and radially spaced from ribs 74 that an even distribution of stress is achieved throughout the hub portion with less weight.

As previously noted, rim portion 48 of tire 40 shown in FIG. 3 has a different cross section from that shown in FIG. 1. It has been found that by providing for a substantially U-shaped retaining space 56 as compared with the substantially V-shaped space 26 of the FIG. 1 embodiment it is unnecessary to provide an expansion space as previously described with respect to the assembly shown in FIGS. 1 and 2.

The flange portions 54, 54 and tire 40 are dimensioned so that when the wheel plates 42, 42 are assembled as described above, retaining portions 58, 58 on the rims compress tightly into retaining grooves 50, 50 positively securing the tire within the rim assembly.

I claim:

1. A wheel assembly comprising:

a tire member of resilient material having a tread portion and a mounting rib portion, said tire provided with a pair of oppositely facing retaining ridges formed on the sides thereof;

a pair of wheel plate members made from steel stampings each having a central hub portion and a retaining flange portion, said flange portions each having a smoothly rounded nose portion adapted to engage and compress the sides of said tire member, said nose portions on said flange portions formed by bending the edges of said flanges first in one direction and then back against themselves; and holding means for securely fastening said wheel plate members together with said oppositely facing retaining ridges on said tires cooperating with said nose portions on said wheel flanges to securely lock said tire between said wheel plate members, said holding means including a plurality of oblong-shaped openings in the central hub portion of one plate member, said openings having their major axes extending radially and adapted to receive a mating holding flange formed on the central hub portion of the other plate member, said holding flanges extending through said openings and being deformed over the edges thereof to securely hold said plates together in assembled position.

2. A wheel assembly according to claim 1 in which said hub portion of each plate member is provided with a plurality of openings and holding flanges alternately spaced around the center of said central hub portion.

3. A wheel assembly according to claim 1 in which said central hub portion of each plate member is provided with a plurality of radially extending reinforcing ribs which extend at least partially over said bearing housing portion.

4. A wheel assembly comprising:

a tire member of resilient material having a tread portion and a mounting rib portion, said tire provided with a pair of oppositely facing retaining ridges formed on the sides thereof;

a pair of wheel plate members made from steel stampings each having a central hub portion and a retaining flange portion, said flange portions each having a smoothly rounded nose portion adapted to engage and compress the sides of said tire member, said nose portions on said flange portions formed by bending the edges of said flanges first in one direction and then back against themselves; and holding means for securely fastening said wheel plate members together with said oppositely facing retaining ridges on said tires cooperating with said nose portions on said wheel flanges to securely lock said tire between said wheel plate members, said holding means including a plurality of openings and a plurality of holding flanges alternately spaced around the center of said central hub portion, said openings adapted to receive said holding flanges with said holding flanges extending through said openings and being deformed over the edges thereof to securely hold said plates together in assembled position, said central hub portion of each plate member being further characterized by a plurality of radially extending reinforcing ribs positioned between said alternately spaced openings and holding flanges.

References Cited

UNITED STATES PATENTS

| | | | |
|---|---|---|---|
| 612,583 | 10/1898 | Davidson | 152—379 |
| 1,256,086 | 2/1918 | Whidden | 301—630X |
| 1,595,182 | 8/1926 | Fravel | 301—63(DD) |
| 1,932,289 | 10/1933 | Jarvis | 301—63(DD) |
| 2,848,278 | 8/1958 | Todd | 301—63(DS) |

FOREIGN PATENTS

| | | | |
|---|---|---|---|
| 26,460 | 1902 | Great Britain | 301—63(DD) |
| 605,410 | 7/1948 | Great Britain | 301—63(DD) |

RICHARD J. JOHNSON, Primary Examiner

U.S. Cl. X.R.

74—230.7